United States Patent Office 3,515,277
Patented June 2, 1970

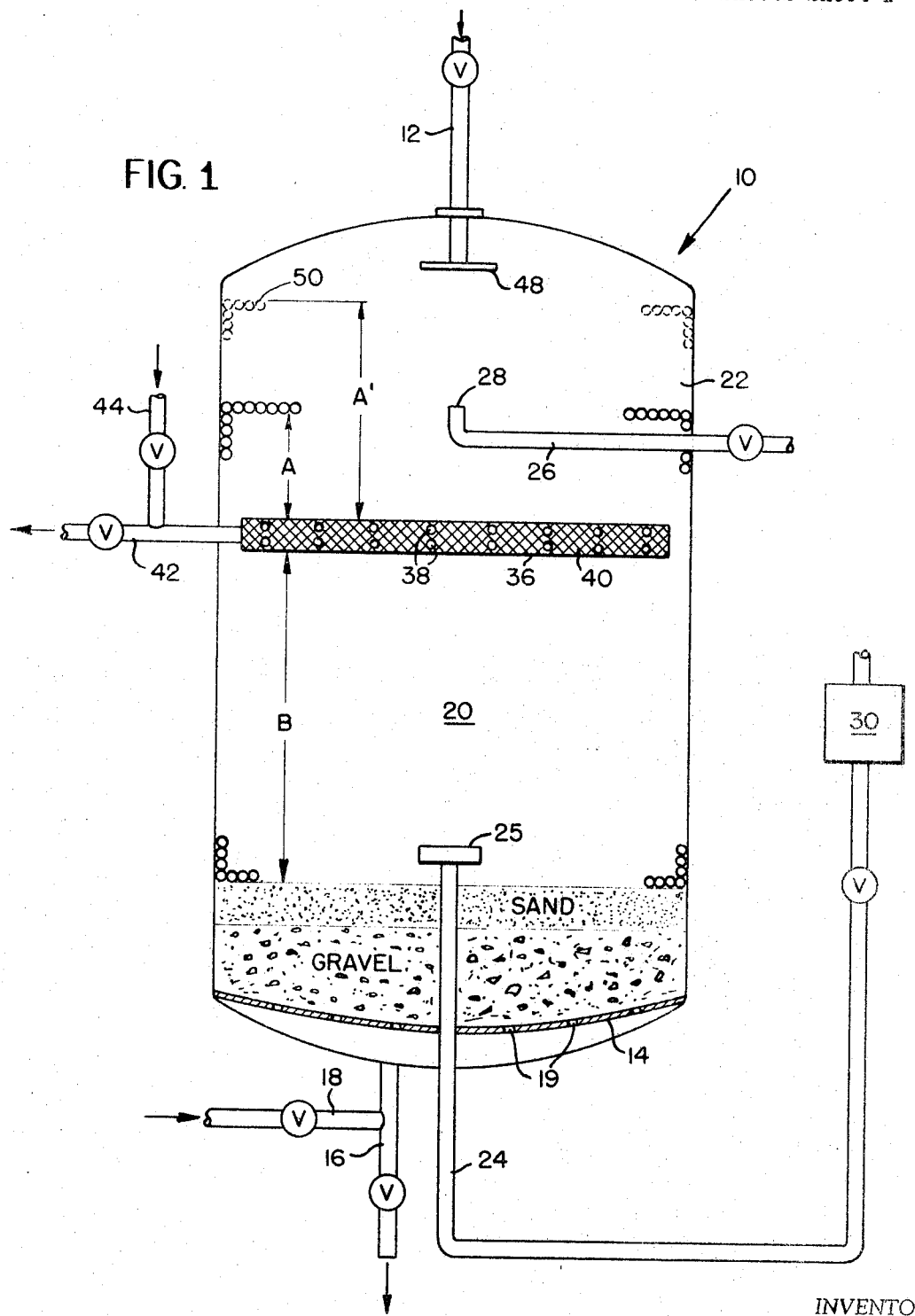

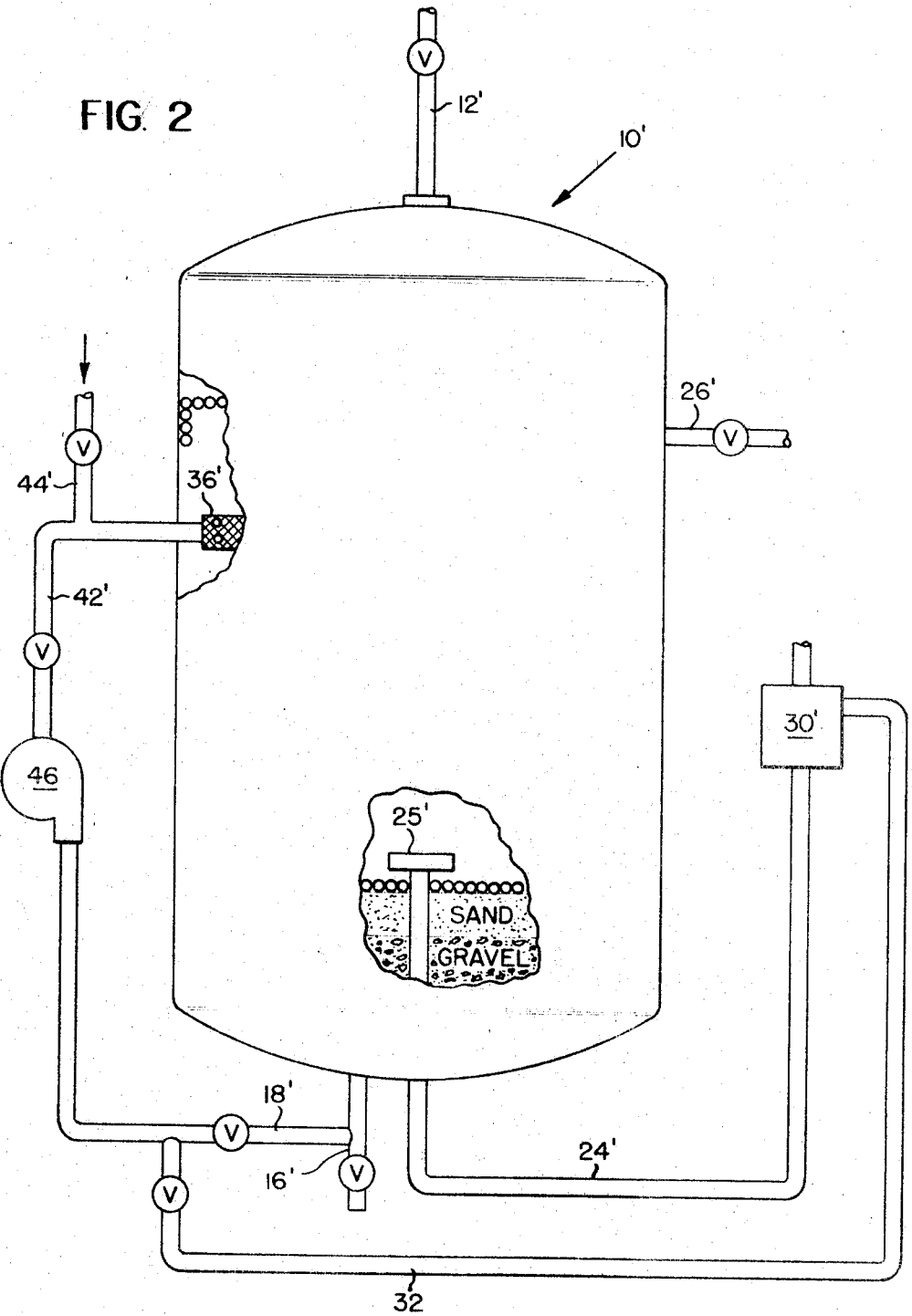

3,515,277
COUNTER-CURRENT ION EXCHANGE WITH DOWNFLOW CONTACTOR
Albert W. Kingsbury, Moorestown, N.J., Durando Miller, Mount Kisco, N.Y., and Gerald Alexander, Fairview, N.J., assignors to Sybron Corporation, Rochester, N.Y., a corporation of New York
Filed Mar. 4, 1969, Ser. No. 804,195
Int. Cl. B01d 15/06
U.S. Cl. 210—33                                  13 Claims

ABSTRACT OF THE DISCLOSURE

A method and apparatus for operating counter-current ion exchange apparatus wherein a service vessel which is adapted for downflow operation is only partly filled with a bed of ion exchange resin. The introduction of fresh resin into the service vessel is accomplished by injecting water into the vessel beneath the bed to lift the bed. Injected water is removed from the vessel at a point below the upper surface of the resin bed and recirculated to the point of injection. Since water passes upwardly through only a portion of the bed, the volume of resin located above the water outlet remains compact and exerts a pressure to suppress the expansion and fluidization of the bed portion located below the water outlet so that the entire bed lifts as a unit. A portion of the recirculating water can be used to force fresh resin from a storage vessel and into the service vessel beneath the lifted bed. After the introduction of fresh resin, a portion of the bed above the water outlet is fluidized and removed from the vessel restoring the bed to its original volume.

BACKGROUND OF THE INVENTION

The present invention relates to counter-current ion exchange apparatus and more particularly to such apparatus wherein the resin bed is replenished by lifting the bed as a unit so that fresh or regenerated resin can be introduced beneath the lifted bed.

The term "counter-current ion exchange" is used to describe a method of operating ion exchange apparatus wherein the resin bed is moved counter-current to the flow of fluid through the resin. In counter-current ion exchange apparatus, resin movement and/or fluid flow can be either continuous or intermittent with fluid flow being either downflow or upflow through the resin bed. The present invention is concerned primarily with downflow fluid operation with intermittent movement of the resin bed upwardly in the vessel. The advantages of counter-current operation, whether continuous or intermittent and whether upflow or downflow are well-known in the art and for purposes of the present invention, it is sufficient to say merely that such a system provides an efficient method of treating the fluid or regenerating the resin.

However, there are several drawbacks of prior art counter-current systems which detract from their overall efficiencies. For example, one type of counter-current system with either intermittent or continuous bed movement employs a service vessel which is completely filled with resin material. Such a system illustrated for example by British Pat. No. 778,859, gives poor distribution for the untreated fluid entering the top of the vessel since the inlet for untreated fluid is in direct contact with the resin. Furthermore, in order to prevent the upward moving resin from passing into the inlet for the untreated fluid, a screen or other similar device is needed to cover the inlet. In cases where the untreated fluid is dirty and contains suspended matter, the screen has a tendency to clog, resulting in an added cost of operation due to the excessive downtime for cleaning.

Furthermore, fluid passing downwardly through the vessel from inlet to outlet has little tendency to flow laterally and only tends to flow vertically in a path of least resistance through the compact bed. Therefore in cases where the resin bed completely fills the service vessel a complex fluid distributor embedded in the resin bed is required to insure the even distribution of untreated fluid over the entire cross-sectional area of the bed.

A further disadvantage of such systems is the tendency of the resin to "channel" as the resin bed is lifted and the new resin introduced beneath the lifted bed. Channeling is a word of art used to describe the effect caused by the inability of the resin in a compact bed to flow laterally. Since the compact resin cannot move laterally only a "channel" or volume of resin located directly beneath the resin outlet is removed. In order to prevent channeling and insure a uniform removal of resin across the entire cross-sectional area of the resin bed, several resin outlets or a complex resin collector system is needed which adds to the cost of the equipment.

The present invention overcomes these disadvantages by providing a service vessel which is only partly filled with ion exchange resin. This arrangement eliminates the problem of the resin being forced into the fluid inlet as the bed is lifted and since the untreated fluid inlet is not in direct contact with the resin, it also permits the use of a simple fluid distributor. The efficiency of the present invention over prior art systems is improved in one embodiment of the invention by the use of a closed loop for the recirculation of fluid used to lift the bed and to force the introduction of resin beneath the lifted bed.

Ion exchange systems which employ a resin bed only partly filling the service vessel are also known in the art. However, such systems usually regenerate the resin bed in situ rather than replace portions of the bed as in counter-current systems and as stated hereinabove, this method is not as efficient an operation as counter-current operations.

SUMMARY OF THE INVENTION

The present invention can be characterized in one aspect thereof by the provision of (a) a service vessel adapted for downflow operation, which is only partly filled with a bed of ion exchange material, the unfilled portion of the vessel allowing for an expansion space above the resin bed;

(b) means for introducing fluid under pressure into the bottom of the vessel for lifting the bed to move a portion of the bed into the expansion space;

(c) means extending into the interior of the vessel intermediate ends of the bed for removing tse pressurized fluid from the vessel to prevent expansion and fluidization of the bed as fluid under pressure is introduced into the vessel to lift the bed; and (d) means communicating with the expansion space for removing from the vessel a portion of the bed lifted into the expansion space.

Coincidentally, the method for operating the apparatus of the present invention comprises the steps of (a) injecting a fluid under pressure into the vessel beneath the bed of material for moving the bed upwardly and at least partially into the expansion space in the vessel;

(b) removing the pressurized fluid from the vessel at a point above the pressure fluid inlet and below the top of the bed, thereby preventing fluidization of the material located above the fluid outlet and causing the material to move as a unit into the expansion space;

(c) introducing additional quantities of material beneath the lifted bed; and (d) fluidizing the portion of the bed moved into the previously expanded space in the vessel to facilitate the removal of such material from the vessel.

OBJECTS OF THE INVENTION

It is an object of our invention to provide a method and apparatus for counter-current ion exchange operation which prevents channeling of resin during resin introduction.

Another object of our invention is to provide a method and apparatus for counter-current ion exchange operation which permits the lifting of the entire resin bed as a unit.

A further object of the present invention is to provide a method and apparatus for counter-current ion exchange operation which permits the use of simplified resin and liquid distributors.

Still another object of the present invention is to provide a method and apparatus for counter-current ion exchange in which a portion of the resin bed is fluidized to facilitate removal from the service vessel.

Another object of the present invention is to provide a method and apparatus for counter-current ion exchange which permits recirculation of fluid used both to lift the resin bed and to force regenerated resin beneath the lifted bed.

Yet another object of the present invention is to provide a simple, efficient counter-current ion exchange apparatus which is relatively low in cost and inexpensive to operate.

These and other objects, advantages and characterizing features of our invention will become more apparent upon consideration of the following detailed description thereof when taken in connection with the accompanying drawings.

DESCRIPTION OF THE DRAWINGS

FIG. 1 represents a schematic representation of the apparatus of our invention; and FIG. 2 is a schematic representation of another embodiment of the apparatus of our invention.

DESCRIPTION OF THE PREFERRED EMBODIMENT

Referring to the drawing, FIG. 1 shows a service vessel generally indicated at 10 set up for downflow operation.

While the vessel can conceivably be used in the treatment of any fluid, the invention will be described for purposes of illustration, as if water were the fluid being treated. The service vessel includes a valved inlet pipe 21 for untreated water or the like located in the top of the service vessel and a valved outlet pipe 16 for treated water and a valved inlet 18 located in the bottom of the service vessel. Service vessel 10 is also provided with a false bottom 14 which contains a plurality of strainers 19 and which supports any suitable subfill or supporting layers such as a layer of coarse sand and a layer of gravel as indicated.

Service vessel 10 is partly filled with a bed 20 of particulate ion exchange material indicated by resin beads at the periphery of the bed. The unfilled portion of the vessel indicated at 22 above the resin bed is an expansion space into which the upper portion of the resin bed can be lifted to permit the introduction of fresh resin at the bottom of the bed.

Extending into the lower portion of the service vessel 10 and terminating adjacent the bottom of resin bed 20 is a valve resin inlet pipe 24 for fresh or regenerated resin which terminates in a T-outlet fitting 25. Extending into the upper portion of the service vessel is a valved resin discharge pipe 26 which terminates in an open drain 28. Resin inlet pipe 24 and resin discharge pipe 26 form a part of a circuit which also includes a resin regenerator and a regenerated resin store vessel not shown. The regenerator and storage vessel form no part of the present invention but are mentioned merely to illustrate that in operation, resin can circulate from the service vessel through the drain and discharge pipe 28 and 26 respectively to a regenerator where the spent resin is regenerated and then to a storage vessel and then to any suitable means such as a resin pump 30, which forces the regenerated resin through resin inlet pipe and T-fitting 24 and 25 respectively and back into the service vessel. It should also be understood that resin pump 30 can also be used as the storage vessel for regenerated resin.

Supported within service vessel 10, by any suitable means, not shown, is a collector 36. Collector 36 is located substantially horizontally in the service vessel between resin T-outlet 25 and discharge pipe 26 so that a portion of the resin bed indicated at A lies above the collector and a second portion of the resin bed indicated at B lies below the collector. Collector 36 is provided with a series of openings 38 and is covered with a screen 40 which permits the passage of water and prevents the passage of resin material into the collector. A valved outlet pipe 42 connected to collector 36 is provided for removing from the vessel any water entering the collector. A valved inlet 44 also connected to collector 36 permits the introduction of fluid under pressure through the collector and into resin bed portion A for purposes set out hereinbelow.

OPERATION OF THE INVENTION

In normal operation, untreated fluid, such as natural water, enters the service vessel 10 through valved inlet pipe 12. The untreated or natural water first strikes a baffle plate 48 which distributes the untreated water over the entire cross-sectional area of the vessel. The water then passes downwardly through the unoccupied portion or expansion space 22 above resin bed 20 before contacting the ion exchange material. The untreated water then flows downwardly through the bed of ion exchange material where the ion exchange process is carried out, and then passes downwardly through the coarse sand and gravel and is discharged from the service vessel as treated water through the valved, outlet pipe 16. Since the flow through the service vessel is downwardly, the upper portion of resin bed 20 becomes exhausted and requires regeneration sooner than the lower portion of the resin bed. Accordingly, when the resin in the upper portion of bed 20 becomes exhausted to the point where it no longer functions efficiently, the entire bed is moved upwardly to permit introduction of fresh resin beneath the lifted bed and removal of exhausted resin from the upper portion of the bed. This lifting of the resin bed together with the introduction of regenerated resin and removal of exhausted resin is accomplished in the following manner.

With valved pipes 12, 16 and 44 closed and valved pipes 18, 24 and 42 open, any suitable fluid such as treated water is forced through valved pipe 18 and into the bottom of the service vessel. False bottom 14 and the screen formed by strainers 19 and the gravel and sand layers evenly distribute this water over the entire cross-sectional area of the resin bed. The water flows upwardly through the lower portion B of resin bed 20, into collector 36 and leaves the vessel through valved pipe 42. The introduction of water under pressure beneath resin bed 20 lifts the entire resin bed upwardly as a unit so that a quantity of fresh resin can be forced by pump 30 through valved resin inlet pipe 24 and T-fitting 25 into the service vessel beneath the lifted bed. Any water which enters the service vessel through resin inlet 24 with the regenerated resin is discharged from the vessel through collector 36 and valved pipe 42 while the resin is retained within the vessel by screen 40.

An important feature of the present invention is that since collector 36 is located between the upper and lower portions A and B respectively of resin bed 20, water under pressure introduced through inlet 18 to lift the bed is prevented from entering the upper portion A. The absence of flow in portion A permits this portion to serve as a free floating piston to exert a pressure on portion B to keep the lower portion of the resin bed from expanding or becoming fluidized when the bed is lifted.

Lifting the resin bed and introducing fresh resin beneath the resin bed raises the exhausted portion of the resin bed 20 into space 22 to a level 50, shown by resin beads in phantom, above the level of drain 28 and increases to A', the portion of resin located above collector 36. In order to remove this exhausted resin from the top of the resin bed, valved pipes 12, 16, 18 and 42 are closed and valved pipe 44 and 26 opened. This permits any suitable fluid such as treated water entering service vessel 10 through inlet pipe 44 and collector 36 to pass through and fluidize portion A' of the resin bed while portion B of the resin bed remains in a compact form. The fluidized resin then flows into open drain 28 and through valved pipe 26 to a resin storage tank, regenerator or the like not shown. When the resin level has reached the level of the drain 28, valved pipe 26 is closed and the remaining resin above collector 36 allowed to settle into compact bed. Normal downward flow of untreated water is then reinstituted until it is again necessary to introduce fresh, regenerated resin at the bottom of resin bed 20 and remove exhausted resin from the top of resin bed 20.

In the embodiment shown in FIG. 1 fluid introduced through valved inlet 18 and drawn off through collector 36 and valved outlet pipe 42 to lift the bed is discharged to waste. In like respect fluid under pressure introduced into resin pump 30 to force resin into the service vessel beneath the lifted bed is also drawn off through collector 36 to waste.

A system for improving the efficiency of the invention by eliminating the discharge to waste and conserving fluid is shown in FIG. 2. In the embodiment of FIG. 2 service vessel 10' has the same internal components as vessel 10 of FIG. 1. Components external of the vessel have been added to permit recirculation and optimum use of fluid in the system. In this respect, valved outlet pipe 42' and valved inlet 18' are connected to form a closed circuit and a pump 46 is located in the circuit with its discharge side connected to valved inlet 18'. A valved pipe 32 also connected at the discharge side of pump 46 communicates with resin pump 30'. With this arrangement valved outlet pipe 42', valved inlet 18' and valved pipe 32 can be opened simultaneously upon activation of pump 46. Initially pump 46 draws fluid from collector 36' and channels the entire flow through valved inlet 18' and into the bottom of vessel 10'. This occurs because the resin in the service vessel surrounding resin inlet 25' prevents flow from resin pump 30'. Flow of all fluid drawn from collector 36' continues to the bottom of vessel 10' until the resin bed is lifted above resin inlet 25'. At this point a portion of the fluid flow passes through branch pipe 32 and into resin pump 30' to force resin from the pump and through resin inlet pipe 24' and inlet 25' to introduce fresh resin beneath the lifted bed. The portion of fluid flow continuing through valved inlet 18' acts to keep resin bed 20' suspended in the service vessel. This flow distribution continues until the level of resin being introduced beneath the lifted bed reaches and blocks resin inlet 25' at which time the entire fluid flow is again channeled through valved inlet 18'. This cycle is repeated until the desired quantity of resin is transferred. Exhausted resin is removed from service vessel 10' in the same manner as set out above with respect to the embodiment of FIG. 1.

This system for recirculation of fluid has several advantages. For example since fluid is recirculated, the need for large volumes of fluid and storage vessels for such volumes is eliminated. Furthermore, with the proper selection of valves for inlet 18' outlet pipe 42' and branch pipe 32, regulating controls can be eliminated as proper flow distribution is controlled by the hydraulic characteristics of the system.

Having thus described our invention in detail, what we claim as new is:

1. A method for removing and replenishing portions of a bed of particulate material contained in a vessel wherein said bed of material occupies only a portion of the volume of said vessel, said method comprising the steps of:
   (a) injecting fluid under pressure into said bed of material near the lower part thereof for moving said bed of material upwardly and at least partially into the unoccupied portion of said vessel;
   (b) removing pressurized fluid from said vessel at a point above the inlet for said fluid and below the top of said bed wherein the portion of said bed located above the outlet for said fluid is not expanded by said pressurized fluid and remains in a compact form which bears on the portion of said bed located below said fluid outlet to prevent fluidization of said latter bed portion as said entire bed moves as a unit into the unoccupied portion of said vessel;
   (c) introducing additional quantities of said particulate material into the portion of said vessel vacated by said lifted bed; and
   (d) removing from said vessel, material lifted into said previously unoccupied portion of said vessel.

2. A method as in claim 1 wherein introducing additional quantities of said particulate material occurs simultaneously with the injecting of fluid under pressure into said vessel.

3. A method as in claim 1 wherein the material removed at step (d) is fluidized prior to said removing step.

4. A method as in claim 3 wherein the step of fluidizing said material is conducted after step (b) by introducing fluid under pressure into said vessel at the point of removal of said pressurized fluid of step (b).

5. A method as set forth in claim 1 further comprising recirculating fluid removed at step (b) to the point of fluid injection at step (a).

6. A method as set forth in claim 5 wherein a portion of said recirculating fluid is circulated to a source of said particulate material for forcing said material from said source and into said vessel at step (c).

7. A method as set forth in claim 6 wherein said portion of recirculating fluid is circulated to said source of particulate material after said bed of particulate material in said vessel is lifted.

8. Apparatus for contacting a fluid to be treated with a bed of particulate material comprising:
   (a) a service vessel having an untreated fluid inlet adjacent the top and a treated fluid outlet adjacent the bottom thereof;
   (b) a bed of particulate treating material in said vessel, the volume of said bed being less than the volume of said vessel so as to leave a portion of said vessel unfilled, said unfilled portion comprising an expansion space above said bed of material;
   (c) means introducing fluid under pressure into said vessel adjacent the bottom thereof for lifting said bed to move a portion of said bed into said expansion space;
   (d) collector means intermediate the ends of said bed for removing said pressurized fluid from said vessel, the portion of said bed located above said collector means remaining in a compact form and bearing on the portion of said bed below said collector means to prevent expansion and fluidization of said latter bed portion whereby said entire bed is lifted in said vessel as a unit; means introducing additional quantities of said particulate material into the portion of said vessel vacated by said lifted bed; and
   (e) means communicating with said expansion space for removing the portion of said bed in said expansion space from said vessel.

9. Apparatus as in claim 8 further comprising means for flowing fluid into and through said expansion space to fluidize the portion of said bed located therein.

10. Apparatus as in claim 8 wherein said means communicating with said expansion space comprises a drain for removing the portion of said bed in said expansion space above the level of the opening of said drain.

11. Apparatus as set forth in claim 8 wherein said collector means communicates with said means introducing fluid under pressure into said vessel to permit recirculation of said fluid through said vessel.

12. Apparatus as set forth in claim 8 further comprising:
(a) a second vessel containing a supply of said treating material;
(b) a conduit connecting said second vessel to the bottom of said service vessel for introducing treating material from said second vessel and into said service vessel beneath said lifted bed.

13. Apparatus as set forth in claim 12 further comprising a pipe communicating with said second vessel and said collector means to pass a portion of said pressurized fluid removed from said service vessel to said second vessel for forcing particulate material from said second vessel through said conduit and into said service vessel beneath said lifted bed.

References Cited

UNITED STATES PATENTS

| 3,056,743 | 10/1962 | Eichhorn et al. | 210—33 |
| 3,385,787 | 5/1968 | Crits et al. | 210—33 X |
| 3,394,079 | 7/1968 | Miller et al. | 210—33 |

FOREIGN PATENTS 778,859   7/1957   Great Britain.

SAMIH N. ZAHARNA, Primary Examiner

U.S. Cl. X.R.

210—189